United States Patent Office.

ALBERT RUTTKAY, OF NEW YORK, N. Y.

Letters Patent No. 109,254, dated November 15, 1870.

IMPROVEMENT IN ROOFING-COMPOSITIONS.

The Schedule referred to in these Letters Patent and making part of the same.

*To all whom it may concern:*

Be it known that I, ALBERT RUTTKAY, of the city, county, and State of New York, have invented a new and useful Improvement in Roofing-Compositions, of which the following is a specification.

Nature and Objects of the Invention.

The invention relates to a composition for roofing or coating purposes, and has for its ingredients sand, or finely-sifted gravel, pulverized brick, litharge, liquid Japan, and linseed-oil.

The object of the invention is to furnish a material capable of being formed into desired shapes in molds or presses, or laid over roofs of slate, shingles, or boards, or to cover the interior of vessels intended to contain liquids, all of which is done while the composition is in a plastic condition. It is then hardened by exposure, when it becomes tenacious, water-proof, and non-combustible.

General Description.

The invention consists of sand or finely-sifted gravel, or other material of a similar character, pulverized brick, or burnt clay reduced to a powder, litharge, and linseed-oil, in the following or similar proportions.

Formula.

Three (3) pounds of sifted gravel or sand.
One-half ($\frac{1}{2}$) pound of pulverized brick.
One-eighth ($\frac{1}{8}$) pound of litharge.
One-fourth ($\frac{1}{4}$) pound of linseed-oil.
One-sixteenth ($\frac{1}{16}$) pound of liquid Japan.

The above ingredients, in the proportions stated, are thoroughly intermixed in a vessel sufficiently tight to prevent the escape of the oil. The product may then be compressed in molds or laid over any roof or the interior of a vessel intended to contain liquids, and rolled or otherwise reduced to a covering of regular and even surface and thickness. It is then allowed to remain undisturbed, and will harden according to the density of the covering, into a consistent mass, impervious to water, non-combustible, of great tenacity and hardness, as well as being entirely capable of resisting the effects of frost or sun, and cannot be disintegrated by hot water.

Claim.

What I claim as my invention, and desire to secure by Letters Patent, is—

The composition herein described, for the uses and purposes herein set forth.

In testimony that I claim the foregoing improvement in roofing-compositions, as above described, I have hereunto set my hand and seal, this 10th day of October, 1870.

ALBERT RUTTKAY. [L. S.]

Witnesses:
O. C. H. HOLBERG,
R. C. KORNEY.